(12) United States Patent
Kato et al.

(10) Patent No.: US 7,070,731 B2
(45) Date of Patent: Jul. 4, 2006

(54) DISPERSION STABILIZER FOR SUSPENSION POLYMERIZATION OF VINYL COMPOUND AND METHOD OF PRODUCING THE SAME

(75) Inventors: Masaki Kato, Kurashiki (JP); Kazuyuki Somemiya, Niigata (JP); Syunji Tago, Niigata (JP); Kiyohiko Sho, deceased, late of Kurashiki (JP); by Yoshiko Sho, legal representative, Kurashiki (JP); by Yukiko Sho, legal representative, Kurashiki (JP); Masako Katayama, Kurashiki (JP); Yoko Nakano, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 290 days.

(21) Appl. No.: 10/732,524

(22) Filed: Dec. 11, 2003

(65) Prior Publication Data
US 2004/0152834 A1    Aug. 5, 2004

(30) Foreign Application Priority Data
Dec. 11, 2002 (JP) ............................. 2002-359605
Dec. 11, 2002 (JP) ............................. 2002-359606

(51) Int. Cl.
*C08F 8/00* (2006.01)
*C08F 16/06* (2006.01)
*C08J 3/00* (2006.01)

(52) U.S. Cl. ..................................... 264/349; 524/557
(58) Field of Classification Search ................ 524/557; 264/349
See application file for complete search history.

(56) References Cited

U.S. PATENT DOCUMENTS

| 5,308,911 A | 5/1994 | Takada et al. |
| 5,334,575 A | 8/1994 | Noonan et al. |
| 5,717,044 A | 2/1998 | Takada |
| 5,780,547 A | 7/1998 | Saeki et al. |
| 5,977,273 A | 11/1999 | Saeki et al. |
| 6,451,898 B1 | 9/2002 | Tanimoto et al. |
| 6,485,842 B1 | 11/2002 | Shindome et al. |
| 6,495,623 B1 | 12/2002 | Tanimoto et al. |
| 6,635,709 B1 | 10/2003 | Kato et al. |

FOREIGN PATENT DOCUMENTS

| DE | 30 48 687 | | 7/1982 |
| EP | 1152032 | * | 11/2001 |
| GB | 653239 | | 5/1951 |
| JP | 61-108602 | | 5/1986 |
| JP | 5-105702 | | 4/1993 |
| JP | 5-88251 | | 12/1993 |
| JP | 8-208724 | | 8/1996 |
| JP | 2002-30104 | | 1/2002 |
| JP | 2002-97208 | | 4/2002 |

OTHER PUBLICATIONS

K. Nagano, et al., Koubunshi Kankoukai, pp. 246-249 and pp. 411-415, "POVAL", 1984.
T. Moritani et al. Macromolecuels, vol. 10, No. 3, pp. 532-535, "13C-and 1H-NMR Investigations of Sequences Distribution in Vinyl Alcohol-Vinyl Acetate Copolymers", May-Jun. 1977.

* cited by examiner

*Primary Examiner*—Kelechi C. Egwim
(74) *Attorney, Agent, or Firm*—Oblon, Spivak, McClelland, Maier & Neustadt, P.C.

(57) ABSTRACT

The present invention provides a new dispersion stabilizer that satisfies, at a high level, the performances required for a dispersion stabilizer used for suspension polymerization. A method of producing a dispersion stabilizer that is useable for suspension polymerization of a vinyl compound and contains a vinyl alcohol polymer (A) includes producing the vinyl alcohol polymer (A) by heat-treating a vinyl alcohol polymer (B) at a temperature of 90 to 180° C. for 0.5 to 20 hours in an atmosphere in which an oxygen concentration is 8000 ppm or lower. The vinyl alcohol polymer (B) has a saponification degree of at least 60 mol % and contains a residual acetic acid group whose block character is in the range of 0.3 to 0.6.

7 Claims, No Drawings

DISPERSION STABILIZER FOR SUSPENSION POLYMERIZATION OF VINYL COMPOUND AND METHOD OF PRODUCING THE SAME

BACKGROUND OF THE INVENTION

1. Field of the Invention

The present invention relates generally to a dispersion stabilizer for use in suspension polymerization of a vinyl compound and a method of producing the same.

2. Related Background Art

Industrially, vinyl polymers such as vinyl chloride resin are produced by suspension polymerization. In this suspension polymerization, a vinyl compound such as vinyl chloride is dispersed in an aqueous medium containing a dispersion stabilizer, and polymerization is conducted using an oil-soluble catalyst. Generally, the factors governing the quality of vinyl polymers include, for example, the degrees of conversion, the water/monomer ratio, the polymerization temperature, the type and amount of catalyst, the type of polymerization vessel, the stirring rate, and the type of dispersion stabilizer. Among these factors, the type of dispersion stabilizer has a considerable effect.

The following properties are important for a dispersion stabilizer used for suspension polymerization of a vinyl compound. (1) Addition of a small amount functions to allow vinyl polymer particles produced therewith to have a narrow particle size distribution. (2) It functions to make vinyl polymer particles produced therewith as uniform as possible and making them porous. This property is required for obtaining, for example, a vinyl polymer that can be processed easily and has a high rate of plasticizer absorption, a vinyl polymer that facilitates the removal of monomers such as vinyl chloride remaining in polymer particles, and a vinyl polymer that can prevent fish eyes from being formed in molded articles. (3) It functions to form polymer particles having a high bulk density. (4) It functions to suppress the generation of wet foam and dry foam and thereby prevent any decrease in productivity. (5) It has no harmful effect on the hue of a vinyl polymer obtained therewith. (6) It does not make an aqueous solution cloudy during charging for polymerization.

Conventionally, as a dispersion stabilizer for suspension polymerization of a vinyl compound, for instance, cellulose derivatives such as methylcellulose and carboxymethylcellulose, and partially saponified polyvinyl alcohol have been used either alone or in appropriate combinations. Conventional dispersion stabilizers, however, do not always satisfactorily meet the performance criteria described in (1) to (6) above.

For instance, polyvinyl alcohol having a polymerization degree of 2000 and a saponification degree of 80 mol % and polyvinyl alcohol having a polymerization degree of 700 to 800 and a saponification degree of 70 mol % are disclosed as dispersion stabilizers for suspension polymerization of vinyl chloride (Poval, Koubunshi Kankoukai, pp. 413–414, issued in 1984). These dispersion stabilizers, however, do not meet satisfactorily the performance criteria described in (1) to (3) above.

Furthermore, JP5(1993)-88251B describes a dispersion stabilizer that is used for suspension polymerization of a vinyl compound and is made of polyvinyl alcohol. This polyvinyl alcohol has a mean degree of polymerization of at least 500 and a ratio Pw/Pn, between a weight average degree of polymerization Pw and a number average degree of polymerization Pn, of 3.0 or lower. This polyvinyl alcohol includes a carbonyl group and a vinylene group adjacent thereto. Furthermore, a 0.1-% aqueous solution of this polyvinyl alcohol has absorbances of at least 0.3 and at least 0.15 at wavelengths of 280 nm and 320 nm in the ultraviolet absorption spectrum, respectively, and a ratio (b)/(a) of the absorbance (b) at a wavelength of 320 nm to the absorbance (a) at a wavelength of 280 nm of at least 0.30.

JP5(1993)-105702A describes a dispersion stabilizer that is used for suspension polymerization of vinyl chloride and is made of polyvinyl alcohol. This polyvinyl alcohol has a saponification degree of 75 to 85 mol % and contains 0.01 to 0.15 mol % carboxyl groups. Its 0.1-wt. % aqueous solution has an absorbance of at least 0.1 at a wavelength of 280 nm and a clouding point of at least 50° C. The above-mentioned two stabilizers made of polyvinyl alcohol, however, also do not always meet the performance criteria described in (1) to (5).

Moreover, JP8(1996)-208724 discloses a dispersant used for suspension polymerization of monomers having an ethylenically unsaturated double bond. This dispersant is made of a vinyl alcohol polymer. Its 1-wt. % aqueous solution has an absorbance of at least 2.5 at a wavelength of 280 nm. The vinyl alcohol polymer has a mean degree of polymerization of at least 500, a saponification degree of 60 to 90 mol %, a ratio Mw/Mn of weight-average molecular weight Mw to number-average molecular weight Mn of 2.5 or lower, a block character with respect to the saponification degree of 0.45 or lower, and a methanol-soluble portion of 10 wt. % or less. This dispersant exhibits properties that are balanced relatively well with respect to the requirements described in (1) to (3). However, in some cases, it does not perform satisfactorily with respect to the requirement described in (6).

SUMMARY OF THE INVENTION

With the foregoing in mind, the present invention intends to provide a new dispersion stabilizer that satisfies, at a high level, the performance criteria required for a dispersion stabilizer for use in suspension polymerization. The present inventors studied assiduously to solve the above-mentioned problems and as a result, achieved the present invention described bellow.

A production method of the present invention is a method of producing a dispersion stabilizer that is suitable for use in suspension polymerization of a vinyl compound and that contains a vinyl alcohol polymer (A). This method comprises producing the vinyl alcohol polymer (A) by heat-treating a vinyl alcohol polymer (B) at a temperature of 90 to 180° C. for 0.5 to 20 hours in an atmosphere having an oxygen concentration of 8000 ppm or lower. The vinyl alcohol polymer (B) has a saponification degree of at least 60 mol %, and contains residual acetic acid groups whose block character is in a range of 0.3 to 0.6.

A dispersion stabilizer of the present invention is a dispersion stabilizer that is suitable for use in suspension polymerization of a vinyl compound and contains a vinyl alcohol polymer (A'). In a 0.1-wt. % aqueous solution of the vinyl alcohol polymer (A'), a ratio (b)/(a) between absorbance (a) at a wavelength of 280 nm and absorbance (b) at a wavelength of 320 nm is at least 0.7. The 0.1-wt. % aqueous solution has a transmittance of at least 80% at a wavelength of 500 nm, at 30° C. Furthermore, a 1-wt. % aqueous solution of the vinyl alcohol polymer (A') has a yellow index (YI) of 40 or lower.

The dispersion stabilizer according to the present invention provides effects such as, for instance, less polymer scale adhesion to the inner wall of a polymerization vessel, as compared to conventional dispersion stabilizers. Hence, the use of the dispersion stabilizer of the present invention allows suspension polymerization to be carried out more stably. Furthermore, foaming caused by polyvinyl alcohol can be suppressed by using this dispersion stabilizer. Moreover, polymer particles with a high bulk density can be produced through the suspension polymerization of a vinyl compound using the dispersion stabilizer. The polymer particles thus formed are industrially very useful since they have gelling characteristics and a high plasticizer absorptivity and are excellent in processability.

DETAILED DESCRIPTION OF THE INVENTION

Hereinafter, preferred embodiments of the present invention are described. The present invention relates to a dispersion stabilizer comprising a vinyl alcohol polymer (hereinafter also referred to as a vinyl alcohol polymer (A)) and a method of producing the same. The dispersion stabilizer of the present invention may contain elements other than the vinyl alcohol polymer (A) as long as the advantageous of the present invention are maintained. The dispersion stabilizer of the present invention can be used as a stabilizer for suspension polymerization of a vinyl compound.

The production method of the present invention includes a step of producing the vinyl alcohol polymer (A) by the heat treatment of a vinyl alcohol polymer (hereinafter also referred to as a vinyl alcohol polymer (B)) at a temperature of 90 to 180° C. for 0.5 to 20 hours in an atmosphere having an oxygen concentration of 8000 ppm or lower. The vinyl alcohol polymer (B) has a saponification degree of at least 60 mol % and contains residual acetic acid groups whose block character is 0.3 to 0.6. Furthermore, dispersion stabilizers containing the vinyl alcohol polymer (A) produced by this method form an another aspect of the invention.

In a preferred example of the present invention, the difference in block character of residual acetic acid groups between the vinyl alcohol polymer (B) that has not been heat-treated and the vinyl alcohol polymer (A) that has been heat-treated is at least 0.02 and the difference in surface tension between their 0.4-wt. % aqueous solutions is 0.5 mN/m or less.

In a preferred example of the present invention, a difference in viscosity between 4-wt. % aqueous solutions of the vinyl alcohol polymer (B) that has not been heat-treated and the vinyl alcohol polymer (A) that has been heat-treated is 0.5 mPa·s or less.

The block character of the residual acetic acid groups of the vinyl alcohol polymer (B) that has not been heat-treated is 0.3 to 0.6, preferably 0.32 to 0.58, and further preferably 0.35 to 0.55. In this specification, the term "residual acetic acid groups (i.e. residual acetoxyl groups)" denotes acetic acid groups (acetoxyl groups) that have not been saponified in the production of the vinyl alcohol polymer carried out by saponification of a vinyl ester polymer. When the block character of the residual acetic acid groups of the vinyl alcohol polymer (B) is less than 0.3, aqueous solutions of the vinyl alcohol polymer (A) that has been heat-treated have a inferior handling properties. On the other hand, when the block character of the residual acetic acid groups of the vinyl alcohol polymer (B) exceeds 0.6, a vinyl polymer obtained by suspension polymerization using the vinyl alcohol polymer (A) has decreased plasticizer absorptivity. In this connection, with respect to the block character of the residual acetic acid groups, details including its measurement and the like are described in Poval (Koubunshi Kankoukai, issued in 1984, pp. 246–249) and Macromolecules, 10, 532 (1977).

The assessment of block character is described briefly herein. The block character η is expressed by the following formula.

$$\eta = (OH, OAc)/[2\cdot(OH)(OAc)]$$

In the above-mentioned formula, (OH) and (OAc) indicate the mole fraction of the vinyl alcohol unit and the mole fraction of the vinyl acetate unit, respectively. Furthermore, (OH, OAc) denotes the mole fraction of the structure with a vinyl alcohol unit and a vinyl acetate unit being in succession. When the vinyl alcohol unit and the vinyl acetate unit are sequenced always alternately, (OH, OAc)=1 and (OH)=(OAc)=0.5, resulting in η=2. When the vinyl alcohol unit and the vinyl acetate unit are sequenced at random, η=1. Moreover, when the vinyl alcohol units and the vinyl acetate unit are separated completely from each other into respective blocks, η=0. That is, the larger the block character η, the lower the rate at which they are separated into blocks is.

The block character of the residual acetic acid groups of the vinyl alcohol polymer can be adjusted by, for example, suitably selecting a saponification catalyst and a solvent that are used in producing the vinyl alcohol polymer through the saponification of a vinyl ester polymer. As compared to alkaline saponification using an alkaline compound for the saponification catalyst, acidic saponification using an acidic compound for the saponification catalyst generally allows a vinyl alcohol polymer having a higher block character to be obtained.

The oxygen concentration in the atmosphere in which the vinyl alcohol polymer (B) is heat-treated is 8000 ppm or lower, preferably 5000 ppm or lower, and more preferably 2000 ppm or lower. When the oxygen concentration exceeds 8000 ppm, the vinyl alcohol polymer that has been heat-treated is colored, which adversely affects the hue of the vinyl polymer obtained by the suspension polymerization using this vinyl alcohol polymer that has been heat-treated. Furthermore, an oxygen concentration exceeding 8000 ppm decreases the plasticizer absorptivity of the vinyl polymer obtained by suspension polymerization using this vinyl alcohol polymer that has been heat-treated. The oxygen concentration in the atmosphere in which the heat treatment is carried out is preferably at least 5 ppm, more preferably at least 10 ppm, particularly preferably at least 20 ppm. The atmosphere in which the heat treatment is carried out may contains a gas other than oxygen that substantially does not react with the vinyl alcohol polymer at a temperature of 180° C. or lower. Examples of such gases include rare gases typified by argon and helium, nitrogen, etc. Among these, nitrogen is industrially preferable.

The temperature at which the vinyl alcohol polymer (B) is heat-treated is 90 to 180° C., preferably 95 to 170° C., and more preferably 100 to 160° C. When the heat treatment temperature is lower than 90° C., certain effects (for instance, the increase in stability during the suspension polymerization) to be provided by the heat treatment cannot be obtained satisfactorily in some cases. On the other hand, when the heat treatment temperature exceeds 180° C., the vinyl alcohol polymer may be cross-linked through the heat treatment in some cases. As a result of such cross-linking, the vinyl polymer obtained by the suspension polymerization using the vinyl alcohol polymer (A) may contain a larger amount of insoluble substances and this causes fish eyes.

The vinyl alcohol polymer (B) is heat-treated for 0.5 to 20 hours, preferably 1 to 18 hours, and more preferably 1 to 16 hours. When the heat treatment time is less than 0.5 hour, the aqueous solution of the resulting vinyl alcohol polymer has inferior handling properties. Furthermore, in a continuous production process, from the viewpoint of attaching importance to the quality of the vinyl alcohol polymer (A) to be obtained after the heat treatment, it is more preferable that the heat treatment time exceeds five hours. When the heat treatment time exceeds 20 hours, the vinyl polymer obtained by the suspension polymerization using the vinyl alcohol polymer (A) has lower plasticizer absorptivity.

The vinyl alcohol polymer (B) that has not been heat-treated and the vinyl alcohol polymer (A) that has been heat-treated both have a saponification degree of at least 60 mol %, preferably 65 to 95 mol %, and more preferably 68 to 90 mol %. When the vinyl alcohol polymer has a saponification degree lower than 60 mol %, this has lower solubility and thereby has a inferior handling properties.

It is preferable that the vinyl alcohol polymer (B) that has not been heat-treated and the vinyl alcohol polymer (A) that has been heat-treated both contain 3.0 wt. % or less of sodium acetate. In this connection, the lower limit of the amount of sodium acetate contained therein is not particularly restricted but preferably is at least 0.01 wt. %.

The difference in block character of the residual acetic acid group between the vinyl alcohol polymer (B) that has not been heat-treated and the vinyl alcohol polymer (A) that has been heat-treated is preferably at least 0.02, more preferably at least 0.025, and more preferably at least 0.03. When the difference in block character of the residual acetic acid groups is less than 0.02, the improvement of the stability during the suspension polymerization provided by the heat treatment cannot be exhibited sufficiently in some cases.

The difference in surface tension between 0.4-wt. % aqueous solutions of the vinyl alcohol polymer (B) that has not been heat-treated and the vinyl alcohol polymer (A) that has been heat-treated is preferably 0.5 mN/m or less, more preferably 0.45 mN/m or less, and more preferably 0.4 mN/m or less. When the difference in surface tension between the 0.4-wt. % aqueous solutions exceeds 0.5 mN/m, the vinyl polymer obtained by the suspension polymerization using the vinyl alcohol polymer (A) may have lower plasticizer absorptivity.

The difference in viscosity between 4-wt. % aqueous solutions of the vinyl alcohol polymer (B) that has not been heat-treated and the vinyl alcohol polymer (A) that has been heat-treated is preferably 0.5 mPa·s or less, more preferably 0.45 mPa·s or less, and further preferably 0.4 mPa·s or less. When the difference in viscosity between the 4-wt. % aqueous solutions exceeds 0.5 mPa·s, the vinyl polymer obtained by the suspension polymerization using the vinyl alcohol polymer (A) may have lower plasticizer absorptivity.

The mean degrees of polymerization of the vinyl alcohol polymers (A) and (B) are both preferably 500 to 4000, more preferably 600 to 3500, and most preferably 650 to 3000. When the mean degrees of polymerization of the vinyl alcohol polymers are lower than 500, the polymerization stability in the suspension polymerization of a vinyl compound may decrease. On the other hand, when the mean degrees of polymerization of the vinyl alcohol polymers exceed 4000, the vinyl alcohol polymers may have inferior handling properties or their productivity may decrease.

The method of producing the vinyl alcohol polymer (B) is not particularly limited. Generally, it is produced using a method comprising saponifying a vinyl ester polymer obtained by the polymerization of vinyl ester monomers. As the method of polymerizing vinyl ester monomers, such methods include solution polymerization, block polymerization, suspension polymerization, emulsion polymerization, etc.

As a polymerization initiator used for polymerizing the vinyl ester monomers, for example, a well-known azo initiator, peroxide initiator, or redox initiator maybe used. The initiator is suitably selected depending on the polymerization method. Examples of azo initiators include 2,2'-azobisisobutyronitrile, 2,2'-azobis(2,4-dimethylvaleronitrile), and 2,2'-azobis(4-methoxy-2,4-dimethylvaleronitrile). Examples of peroxide initiators include percarbonate compounds such as diisopropyl peroxydicarbonate, di-2-ethylhexyl peroxydicarbonate, and diethoxyethyl peroxydicarbonate; perester compounds such as t-butyl peroxyneodecanate, α-cumyl peroxyneodecanate, and t-butyl peroxydecanate; acetylcyclohexylsulfonyl peroxide; and 2,4,4-trimethylpentyl-2-peroxyphenoxyacetate. Further, combinations of the above-mentioned initiators with, for example, potassium persulfate, ammonium persulfate, or hydrogen peroxide also can be used as an initiator. Examples of redox initiators include combinations of the above mentioned peroxides with a reductant such as sodium hydrogensulfite, sodium hydrogencarbonate, tartaric acid, L-ascorbic acid, Rongalit, etc. The polymerization temperature usually is selected from the range of 0 to 180° C.

Examples of the vinyl ester monomers include vinyl formate, vinyl acetate, vinyl propionate, vinyl butyrate, vinyl isobutyrate, vinyl pivalate, vinyl versatate, vinyl caproate, vinyl caprylate, vinyl laurylate, vinyl palmitate, vinyl stearate, vinyl oleate, and vinyl benzoate. Among them, vinyl acetate is most preferable. When using vinyl acetate by itself, it is also is possible to obtain a vinyl alcohol polymer (B) by polymerizing vinyl acetate to produce polyvinyl acetate and then saponifying the polyvinyl acetate. The vinyl alcohol polymer (B) may contain substantially no ethylene units. In this connection, the phrase "contain substantially no ethylene units" denotes that the content of ethylene units is less than 0.5 mol %.

In the polymerization of vinyl ester monomers, other monomers may be copolymerized without parting from the scope of the present invention. Examples of the monomers to be copolymerized include α-olefins such as ethylene, propylene, n-butene, and isobutylene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and salts thereof; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide; acrylamide derivatives such as N-methylacrylamide, N-ethylacrylamide, N,N-dimethylacrylamide, diacetonacrylamide, acrylamide propanesulfonic acid and salts thereof, acrylamide propyl dimethylamine and salts or quaternary salts thereof, and N-methylolacrylamide and derivatives thereof; methacrylamide; methacrylamide derivatives such as N-methylmethacrylamide, N-ethylmethacrylamide, methacrylamide propanesulfonic acid and salts thereof, methacrylamide propyl dimethylamine and salts or quaternary salts thereof, and N-methylolmethacrylamide and derivatives thereof; vinyl ethers such as methylvinyl ether, ethylvinyl ether, n-propylvinyl ether, i-propylvinyl ether, n-butylvinyl ether, i-butylvinyl ether, t-butylvinyl ether, dodecylvinyl ether, and stearylvinyl ether; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate and allyl chloride; unsaturated dicarboxylic acids such as maleic acid, itaconic acid, and fumaric acid, and salts or esters thereof; vinylsilyl compounds such as vinyltrimethoxysilane; and isopropenyl acetate. In addition, combinations of different types of monomers mentioned above may be used.

In the polymerization of vinyl ester monomers, the vinyl ester monomers may be polymerized in the presence of a chain transfer agent for the purposes of, for example, adjusting the polymerization degree of the resulting vinyl ester polymers. Examples of chain transfer agents include aldehydes such as acetaldehyde, propionaldehyde, butyraldehyde, and benzaldehyde; ketones such as acetone, methyl ethyl ketone, hexanone, and cyclohexanone; mercaptans such as 2-hydroxy ethanethiol and dodecylmercaptan; and hydrocarbon halides such as trichloroethylene and perchloroethylene. Among these, aldehydes and ketones are used suitably. The amount of the chain transfer agent to be added depends on the chain transfer constant of the chain transfer agent and the polymerization degree of the vinyl ester polymer to be obtained. Generally, the amount of the chain transfer agent is desirably 0.1 to 10 wt. % with respect to the amount of vinyl ester monomers.

The saponification of the vinyl ester polymer can be carried out by well-known methods, for example, alcoholysis or hydrolysis using a basic catalyst such as sodium hydroxide, potassium hydroxide, and sodium methoxide, or an acid catalyst such as p-toluenesulfonic acid. The solvent can be, for example, alcohols such as methanol and ethanol; esters such as methyl acetate and ethyl acetate; ketones such as acetone and methyl ethyl ketone; and aromatic hydrocarbons such as benzene and toluene. These solvents can be used individually, or as combinations of two types or more types. Particularly, a saponification reaction using methanol or a methanol/methyl acetate mixture as solvent and sodium hydroxide as catalyst can be carried out easily.

In a preferred example of the method of producing the vinyl alcohol polymer (B), first vinyl ester monomers are polymerized in the presence of an initiator and a compound (for instance, aldehydes or ketones) having a carbonyl group in its molecule and thereby a vinyl ester polymer is produced. Thereafter, the vinyl ester polymer thus obtained is saponified to produce a vinyl alcohol polymer.

Next, the description is directed to a dispersion stabilizer of the present invention that is usable for suspension polymerization of a vinyl compound. This dispersion stabilizer is composed of a vinyl alcohol polymer (hereinafter referred to as a "vinyl alcohol polymer (A')" in some cases). This vinyl alcohol polymer (A') can be produced by the above-mentioned method of the present invention. The dispersion stabilizer of the present invention may also comprise components other than the vinyl alcohol polymer (A') as long as they do not contravene the intention of the present invention.

The vinyl alcohol polymer (A') is described as follows. In a 0.1-wt. % aqueous solution of the vinyl alcohol polymer (A'), the ratio (b)/(a) between the absorbance (a) at a wavelength of 280 nm and the absorbance (b) at a wavelength of 320 nm is at least 0.7. The 0.1-wt. % aqueous solution of the vinyl alcohol polymer (A') has a transmittance of at least 80% at a wavelength of 500 nm, at 30° C. Furthermore, a 1-wt. % aqueous solution of the vinyl alcohol polymer (A') has a YI of 40 or lower.

Moreover, it is preferable that the residual acetic acid groups of the vinyl alcohol polymer (A') have a block character of at least 0.35. In the vinyl alcohol polymer (A'), it is preferable that the ratio Mw/Mn between weight-average molecular weight Mw and number-average molecular weight Mn is in the range of 2.1 to 4.9.

The absorbance (a) at a wavelength of 280 nm of the 0.1-wt. % aqueous solution of the vinyl alcohol polymer (A') is preferably at least 0.1, more preferably at least 0.2, and most preferably at least 0.25. The upper limit of the absorbance (a) is not particularly restricted, but is, for example, 0.8 or lower. On the other hand, the absorbance (b) at a wavelength of 320 nm of the above-mentioned aqueous solution is preferably at least 0.07, more preferably at least 0.09, and most preferably at least 0.1. The upper limit of the absorbance (b) is not particularly restricted, but is, for example, 0.6 or lower. The ratio (b)/(a) between the absorbance (b) and the absorbance (a) is at least 0.7, preferably in the range of 0.7 to 1.5. When the ratio (b)/(a) is lower than 0.7, the polymerization stability in the suspension polymerization of a vinyl compound may deteriorate in some cases. The absorbance mentioned above can be measured by the method described in the accompanying Examples.

Examples of the method of adjusting the above-mentioned ratio (b)/(a) to at least 0.7 include a method of treating the vinyl alcohol polymer with acid or alkali and a method of heat-treating the vinyl alcohol polymer.

The YI of the 1-wt. % aqueous solution of the vinyl alcohol polymer (A') is 40 or lower, preferably 35 or lower, and further preferably 30 or lower. In the case where the YI of the 1-wt. % aqueous solution of the vinyl alcohol polymer (A') exceeds 40, while the polymer obtained by the suspension polymerization is processed, the polymer is colored. The case therefore is not preferable. The YI (yellow index) is a value indicating yellowness and is expressed as a positive amount corresponding to the degree to which the hue departs from a transparent or white color toward yellowish colors. A smaller value of YI means that the hue is closer to the transparent or white color.

The 0.1-wt. % aqueous solution of the vinyl alcohol polymer (A') has a transmittance of at least 80%, preferably at least 82%, and more preferably at least 85% at a wavelength of 500 nm, at 30° C. When the 0.1-wt. % aqueous solution of the vinyl alcohol polymer has a transmittance lower than 80%, at 30° C., the aqueous solution of the vinyl alcohol polymer has a inferior handling properties.

The residual acetic acid groups of the vinyl alcohol polymer (A') preferably have a block character of at least 0.35, more preferably at last 0.37, and most preferably at least 0.4. When the residual acetic acid groups of the vinyl alcohol polymer have a block character lower than 0.35, the aqueous solution of the vinyl alcohol polymer may have a inferior handling properties.

The ratio Mw/Mn, of weight-average molecular weight Mw to number-average molecular weight Mn, of the vinyl alcohol polymer (A') is preferably 2.1 to 4.9, more preferably 2.2 to 4.7, and most preferably 2.2 to 4.4. When the value of Mw/Mn is larger than 4.9, the vinyl polymer particles obtained by suspension polymerization of a vinyl compound have a broader particle size distribution. In this connection, the number-average molecular weight Mn and the weight-average molecular weight Mw of the vinyl alcohol polymer are values measured by the gel permeation chromatography (GPC) method described herein.

The ratio Mw/Mn of the vinyl alcohol polymer can be adjusted by various methods, for example, by the following methods. A first method is a method of blending vinyl alcohol polymers having different polymerization degrees. A second method is a method of saponifying a blend of vinyl ester polymers having different polymerization degrees from each other. A third method is a method of producing a vinyl ester polymer containing a component with a low polymerization degree using an agent for controlling the polymerization degree such as aldehydes, hydrocarbon halides or mercaptans, and then saponifying the vinyl ester polymer thus obtained. A fourth method is a method of producing a vinyl ester polymer by carrying out polymerization of vinyl ester monomers in multiple steps while adjusting their polymerization degree in each step, and then saponifying the vinyl ester polymer thus obtained. Furthermore, a fifth method is a method of producing a vinyl ester polymer while adjusting the rate of polymerization of vinyl ester monomers and then saponifying the vinyl ester polymer thus obtained.

The saponification degree of the vinyl alcohol polymer (A') is preferably at least 60 mol %, more preferably 65 to 95 mol %, and most preferably 68 to 90 mol %. When the saponification degree of the vinyl alcohol polymer is lower than 60 mol %, the vinyl alcohol polymer has a lower water-solubility and may thus have inferior handling properties.

The mean degree of polymerization of the vinyl alcohol polymer (A') is preferably 500 to 4000, more preferably 600 to 3500, and most preferably 650 to 3000. When the mean degree of polymerization of the vinyl alcohol polymer is lower than 500, the polymerization stability in the suspension polymerization of a vinyl compound may decrease. On the other hand, when the mean degree of polymerization of the vinyl alcohol polymer is higher than 4000, the vinyl polymer obtained by the suspension polymerization of a vinyl compound may have a lower plasticizer absorptivity or the vinyl polymer particles may have a broader particle size distribution.

Next, the description is directed to an example of the method of producing a vinyl polymer by suspension polymerization of a vinyl compound using the dispersion stabilizer of the present invention.

In the suspension polymerization of a vinyl compound in an aqueous medium using the dispersion stabilizer of the present invention, the temperature of the aqueous medium is not particularly limited. The aqueous medium can be suitably used at, for example, in a range of 20° C. to 90° C., or at even high temperature. This aqueous medium can be pure water or an aqueous medium that contains an aqueous solution containing various additives, or another organic solvent. The amount of aqueous medium to be supplied to a polymerization reaction system is not restricted as long as it allows the polymerization reaction system to be heated sufficiently. Furthermore, in order to increase heat removal efficiency, a polymerization vessel fitted with a reflux condenser is also used suitabe.

When the suspension polymerization of a vinyl compound is carried out using the dispersion stabilizer of the present invention, the amount of the dispersion stabilizer to be used is not particularly limited, but is preferably 0.01 to 5 parts by weight, more preferably 0.02 to 2 parts by weight, and most preferably 0.02 to 1 part by weight with respect to 100 parts by weight of the vinyl compound.

The dispersion stabilizer of the present invention may be used by itself or together with another dispersion stabilizer that is usually used for suspension polymerization of a vinyl compound in an aqueous medium. Examples of such dispersion stabilizers include water-soluble cellulose ethers such as methyl cellulose, hydroxyethyl cellulose, hydroxypropyl cellulose, and hydroxypropylmethyl cellulose. In addition, water-soluble polymers such as vinyl alcohol polymer and gelatin may also be used. Furthermore, oil-soluble emulsifying agents also may be used including, for example, sorbitan monolaurate, sorbitan trioleate, glycerin tristearate, and ethylene oxide/propylene oxide block copolymers. Moreover, water-soluble emulsifying agents can also be used including, for example, polyoxyethylenesorbitan monolaurate, polyoxyethyleneglycerin oleate, and sodium laurate. The amount of a dispersant added to the polymerization reaction is not particularly limited, but is preferably 0.01 to 1.0 part by weight per 100 parts by weight of the vinyl compound.

In the suspension polymerization of a vinyl compound using the dispersion stabilizer of the present invention, the polymerization initiator can be selected from those conventionally used for polymerizing a vinyl compound. Specifically, the same initiators as those described as examples in the above-mentioned method of polymerizing vinyl ester monomers can be used.

Furthermore, in the suspension polymerization of a vinyl compound using the dispersion stabilizer of the present invention, other various additives may be added to the polymerization system as required. Examples of the additives include agents for controlling the polymerization degree such as aldehydes, hydrocarbon halides, and mercaptans; and polymerization inhibitors such as phenolic compounds, sulfur compounds, and N-oxide compounds. Further, pH adjustors, scale inhibitors, and crosslinking agents can also be added as required, and a plurality of the additives mentioned above may be used together.

Examples of vinyl compounds that can be subjected to suspension polymerization using the dispersion stabilizer of the present invention include vinyl chloride alone, or a monomer mixture containing vinyl chloride as its main component (vinyl chloride: at least 50 wt. %). Examples of the comonomers to be copolymerized with vinyl chloride include vinyl esters such as vinyl acetate and vinyl propionate; (meth)acrylic acid esters such as methyl(meth)acrylate and ethyl(meth)acrylate; α-olefins such as ethylene and propylene; unsaturated dicarboxylic acids such as maleic anhydride and itaconic acid; acrylonitrile, styrene, vinylidene chloride, vinyl ether, and other monomers that can be copolymerized with vinyl chloride. Furthermore, the dispersion stabilizer of the present invention can also be used in the case where the above-mentioned vinyl compound containing no vinyl chloride is polymerized individually or is copolymerized.

In the suspension polymerization of the vinyl compound using the dispersion stabilizer of the invention, the proportion of each component to be charged, the polymerization temperature, and the like may be determined according to the conditions employed conventionally in suspension polymerization of vinyl compounds such as vinyl chloride. Further, the vinyl compound, the polymerization initiator, the aqueous medium, and other conditions (for instance, the order of charging additives or the ratio thereof) are not limited at all. Moreover, a method also is used suitably in which hot water is used as the aqueous medium and the vinyl compound is heated before being charged into a polymerization vessel.

As described above, according to the present invention, a dispersion stabilizer can be obtained that allows suspension polymerization to be carried out stably by providing effects such as, for example, less polymer scale adhesion to the inner wall of the polymerization vessel. The use of this dispersion stabilizer can inhibit foaming caused by vinyl alcohol polymer. Furthermore, by the suspension polymerization of a vinyl compound carried out using the dispersion stabilizer, vinyl polymer particles can be produced that are less colored and have high plasticizer absorptivity and a high bulk density.

EXAMPLES

Hereinafter, the present invention is described in further detail using examples but is not limited to the examples by no means. In the examples described below, "%" denotes "% by weight (wt. %)" unless otherwise specified.

Analysis of Vinyl Alcohol Polymer

A method of analyzing a vinyl alcohol polymer is described as follows.

(1) Mean Degree of Polymerization

The mean degree of polymerization was measured according to JIS K6726 that is a method specified by Japanese Industrial Standard (JIS).

(2) Saponification Degree

The saponification degree was measured according to JIS K6726.

(3) Block Character

The block character was determined from the peak in the methylene region of $^{13}$C-NMR according to the measurement method described in Poval (Koubunshi Kankoukai, issued in 1984, pp. 246–249) and Macromolecules, 10, 532 (1977). Specifically, $^{13}$C-NMR measurements were carried out and the above-mentioned mole fractions (OH), (OAc) and (OH, OAc) were calculated from the intensities of resonances corresponding to a methylene group in "—CHOH—CH$_2$—CHOH—" structure, a methylene group in "—CHOH—CH$_2$—CHOAc—" structure and a methylene group in "—CHOAc—CH$_2$—CHOAc—" structure. The block character was determined from the mole fractions (OH), (OAc) and (OH, OAc).

(4) Surface Tension

A 0.4-wt. % aqueous solution of a vinyl alcohol polymer was prepared and its surface tension at 20° C. was measured using a surface tension balance (manufactured by KYOWA INTERFACE SCIENCE CO., LTD.; CBUP-A3) by the Wilhelmy method.

(5) Viscosity

The viscosity was measured according to JIS K6726.

(6) Absorbance

A 0.1-wt. % aqueous solution of a vinyl alcohol polymer was prepared as a test portion. With respect to this test portion, absorbance at wavelengths of 280 nm and 320 nm was measured with the optical path length being 1 cm. A UV spectrophotometer (manufactured by Shimadzu Corporation; UV2100) was used for the measurement.

(7) YI (Yellow Index)

A 1-wt. % aqueous solution of a vinyl alcohol polymer was prepared and its YI was measured according to JIS K7103. A color-difference meter (manufactured by Nihon Denshoku Kogyo Co., Ltd.; ZE-200) was used for the measurement.

(8) Transmittance

With respect to a 0.1-wt. % aqueous solution (30° C.) of a vinyl alcohol polymer, the transmittance at a wavelength of 500 nm of a test portion was measured with the optical path length being 1 cm. The UV spectrophotometer (manufactured by Shimadzu Corporation; UV2100) was used for the measurement.

(9) Calculation of the Ratio Mw/Mn

Using monodispersed polymethyl methacrylate as a specimen and hexafluoroisopropanol containing 20 millimole/liter of sodium trifluoroacetate for the mobile phase, the GPC measurement was carried out at 40° C. and thereby the weight-average molecular weight Mw and the number-average molecular weight Mn of the vinyl alcohol polymer were determined. Subsequently, the ratio Mw/Mn was calculated from the measured values thus obtained.

Evaluation of Polymerizability of Vinyl Chloride Monomers and Properties of Vinyl Chloride Polymer Obtained The following description is directed to a method of evaluating the polymerizability of vinyl chloride monomers and properties of a vinyl chloride polymer obtained.

(10) Mean Particle Diameter

The particle size distribution was measured by a dry sieve analysis using a wire mesh that meets the Tailer mesh standard, and then the mean particle diameter was determined.

(11) Bulk Density

The bulk density was measured according to JIS K6721.

(12) Cold Plasticizer Absorption (CPA)

Absorption of dioctyl phthalate at 23° C. was measured by the method described in ASTM-D3367–75.

(13) Foaming

The state of foaming that occurred inside a reactor vessel was observed visually 30 minutes after the start of polymerization of vinyl chloride, and was evaluated according to the following criteria. In this case, the liquid level was at a height of 70% from the bottom face of the reactor vessel.

AA: Almost no foaming was observed.

A: Foaming was observed up to a height of 75 to 80% from the bottom face of the reactor vessel.

B: Foaming was observed up to a height of 80 to 90% from the bottom face of the reactor vessel.

C: Foaming was observed up to a height of 90 to 100% from the bottom face of the reactor vessel.

(14) Polymerization Stability

After a polymer slurry was taken out of the reactor vessel, the state of scale adhesion inside the reactor vessel was observed visually. The scale adhesion was evaluated according to the following criteria.

A: Almost no adhesion of polymer scales was observed.

B: White polymer scales were observed on the inner wall of the reactor vessel.

C: A lot of white polymer scales were observed on the inner wall of the reactor vessel.

(15) Coloration of Vinyl Chloride Polymer

First, 100 parts by weight of vinyl chloride polymer, 2.5 parts by weight of dibutyltin maleate, and 40 parts by weight of dioctyl phthalate used as a plasticizer were mixed together. Then this mixture was kneaded by open rolling at 170° C. for five minutes to obtain a sheet with a thickness of about 1 mm. The degree to which the sheet was colored was observed visually and was determined as follows.

A: Hardly colored.

B: Slightly colored.

C: Greatly colored.

Production Example 1 of Vinyl Alcohol Polymer

A production example of a vinyl alcohol polymer is described below. First, 133 kg of vinyl acetate, 7.0 kg of methanol, and 2.7 kg of acetaldehyde were charged into a reactor vessel. Thereafter, the atmosphere inside the reactor vessel was replaced with nitrogen by bubbling of nitrogen gas. Separately, 2,2'-azobisisobutyronitrile was dissolved in methanol to prepare an initiator solution with a concentration of 0.8 g/L. This initiator solution was flushed with nitrogen by bubbling of nitrogen gas.

Next, the temperature of the reactor vessel was raised. When its internal temperature reached 60° C., 420 mL of the above-mentioned initiator solution was added into the reactor vessel and thereby polymerization was started. During the polymerization, the polymerization temperature was maintained at 60° C., and the initiator solution was added continuously at a rate of 1310 mL/hr. The container was cooled to stop the polymerization 4 hours after the start of the polymerization. At that point in time, the conversion was 40%. Subsequently, while methanol was added at intervals, unreacted vinyl acetate monomers were removed from the reacted solution under reduced pressure at 30° C. to obtain a methanol solution of polyvinyl acetate (with a concentration of 50%).

To a portion sampled from the methanol solution of polyvinyl acetate was added a methanol solution of sodium hydroxide whose concentration was 10% so that an alkali molar ratio (the mole ratio of an alkali compound to a vinyl acetate unit in the polyvinyl acetate) reached 0.5. This was left at 60° C. for five hours to allow saponification to proceed. After completion of the saponification, the Soxhlet extraction was conducted using methanol for three days and then drying was carried out under reduced pressure at 80° C. for three days. Thus, purified polyvinyl alcohol was obtained. The mean degree of polymerization of the polyvinyl alcohol was measured according to JIS K6726 and was 700.

To the above-mentioned methanol solution of polyvinyl acetate whose concentration was 50% were added water, methanol, methyl acetate, and a methanol solution of sodium hydroxide whose concentration was 10% so that the amounts of polyvinyl acetate, water, and methyl acetate were 30%, 1%, and 30%, respectively and the alkali molar ratio was 0.018. Thus, the polyvinyl acetate was saponified. Gelling occurred about three minutes after the addition of alkali. This gelled material was pulverized by a pulverizer, which was then left at 40° C. for one hour to allow saponification to proceed. Thereafter, the same volume of a mixed solution of methyl acetate/water (8/2) as the volume of the reaction solution was added to the reaction system to neutralize residual alkali. After completion of the neutralization was confirmed using a phenolphthalein indicator, polyvinyl alcohol was obtained through centrifugal deliquoring. This polyvinyl alcohol was dried at 60° C. for one day and then its saponification degree was measured according to JIS K6726. The saponification degree was 70 mol %. This polyvinyl alcohol was heat-treated at 120° C. for 10 hours under a nitrogen atmosphere in which the oxygen concentration was 400 ppm. Consequently, a vinyl alcohol polymer (P-1) was obtained.

Production Examples 2 to 16 of Vinyl Alcohol Polymers

Vinyl alcohol polymers (P-2 to P-16) were produced in the same manner as in Production Example 1 except for the following points that were changed suitably: the charging amounts of vinyl acetate monomers, methanol, initiator, and acetaldehyde used in polymerizing vinyl acetate monomers; the alkali molar ratio and the solvent composition employed in saponifying polyvinyl acetate; and the oxygen concentration in the atmosphere and the heat treatment temperature and time employed in heat-treating the vinyl alcohol polymer.

Production Example 17 of Vinyl Alcohol Polymer

In Production Example 17, a vinyl alcohol polymer was produced using two types of polyvinyl acetate. Specifically, first, 133 kg of vinyl acetate, 7.0 kg of methanol, and 5.8 kg of acetaldehyde were charged into a reactor vessel. Thereafter, the atmosphere inside the reactor vessel was replaced with nitrogen by bubbling of nitrogen gas. Separately, 2,2'-azobisisobutyronitrile was dissolved in methanol to prepare an initiator solution with a concentration of 0.8 g/L. This initiator solution was flushed with nitrogen by bubbling of nitrogen gas.

Next, the temperature of the reactor vessel was raised. When its internal temperature reached 60° C., 420 mL of the above-mentioned initiator solution was added into the reactor vessel and thereby polymerization was started. During the polymerization, the polymerization temperature was maintained at 60° C., and the initiator solution was added continuously at a rate of 1310 mL/hr. The container was cooled to stop the polymerization 4.5 hours after the start of the polymerization. At that point in time, the conversion was 40%. Subsequently, while methanol was added at intervals, unreacted vinyl acetate monomers were removed from the reacted solution under reduced pressure at 30° C. to obtain a methanol solution of polyvinyl acetate (with a concentration of 60%).

To a portion sampled from the methanol solution of polyvinyl acetate was added a methanol solution of sodium hydroxide whose concentration was 10% so that the alkali molar ratio (the mole ratio of an alkali compound to a vinyl acetate unit in the polyvinyl acetate) reached 0.5. This was left at 60° C. for five hours to allow saponification to proceed. After completion of the saponification, the Soxhlet extraction was conducted using methanol for three days and then drying was carried out under reduced pressure at 80° C. for three days. Thus, purified polyvinyl alcohol was obtained. The mean degree of polymerization of the polyvinyl alcohol was measured according to JIS K6726 and was 450.

Furthermore, polyvinyl acetate whose mean degree of polymerization was 1000 was obtained through polymerization conducted in the same manner as described above except that the charging amounts of vinyl acetate monomers, methanol, initiator, and acetaldehyde were changed.

The polyvinyl acetate whose mean degree of polymerization was 450 and the polyvinyl acetate whose mean degree of polymerization was 1000 were blended in a weight ratio of 55/45. As a result, a polyvinyl acetate whose mean degree of polymerization was 700 was obtained. This polyvinyl acetate was dissolved in methanol to prepare a methanol solution of polyvinyl acetate whose concentration was 55%. Thereafter, to this methanol solution were added water, methanol, methyl acetate, and a methanol solution of sodium hydroxide whose concentration was 10% so that the amounts of polyvinyl acetate, water, and methyl acetate were 30%, 1%, and 30%, respectively, and the alkali molar ratio was 0.02. Thus, the polyvinyl acetate was saponified. Gelling occurred about five minutes after the addition of alkali. This gelled material was pulverized by a pulverizer, which was then left at 40° C. for one hour to allow saponification to proceed. Thereafter, the same volume of a mixed solution of methyl acetate/water (8/2) as the volume of the reaction solution was added to the reaction system to neutralize residual alkali. After completion of the neutralization was confirmed using a phenolphthalein indicator, a vinyl alcohol polymer was obtained through centrifugal deliquoring. This vinyl alcohol polymer was left in a drier at 60° C. for one day and was then heat-treated at 120° C. for 10 hours under a nitrogen atmosphere. Consequently, a vinyl alcohol polymer (P-17) was obtained.

Tables 1-1, 1-2, 2-1, and 2-2 indicate conditions employed for producing the vinyl alcohol polymers (P-1 to P-17) described in the above and results of the analysis of vinyl alcohol polymers that was carried out before and after the heat treatment. Production Examples 14 and 15 are examples that were not heat-treated and are different from each other in the block character of the acetic acid groups. The evaluation results indicated in Tables 2-1 and 2-2 are the results of evaluation of the vinyl alcohol polymers that were heat-treated except for P-14 and P-15. In Tables 2-1 and 2-2, the evaluation results of P-14 and P-15 are results of evaluation of the vinyl alcohol polymers that were not heat-treated.

TABLE 1-1

|  | Name | Polymerization Degree | Saponification Degree (mol %) | Conditions of Heat Treatment ||||
|---|---|---|---|---|---|---|
|  |  |  |  | Oxygen Concentration (ppm) | Time (hr) | Temperature (° C.) |
| Prod. Ex. 1 | P-1 | 700 | 70 | 400 | 10 | 120 |
| Prod. Ex. 2 | P-2 | 1700 | 78 | 100 | 18 | 100 |
| Prod. Ex. 3 | P-3 | 2300 | 85 | 5 | 5 | 140 |
| Prod. Ex. 4 | P-4 | 700 | 70 | 500 | 1 | 120 |
| Prod. Ex. 5 | P-5 | 700 | 70 | 400 | 18 | 120 |
| Prod. Ex. 6 | P-6 | 700 | 70 | 2000 | 10 | 120 |
| Prod. Ex. 7 | P-7 | 700 | 70 | 5000 | 10 | 120 |
| Prod. Ex. 8 | P-8 | 700 | 70 | 8000 | 10 | 120 |
| Prod. Ex. 9 | P-9 | 1700 | 78 | 1000 | 18 | 190 |
| Prod. Ex. 10 | P-10 | 700 | 70 | 400 | 10 | 70 |
| Prod. Ex. 11 | P-11 | 700 | 70 | 400 | 25 | 120 |
| Prod. Ex. 12 | P-12 | 700 | 70 | 10000 | 10 | 120 |
| Prod. Ex. 13 | P-13 | 700 | 70 | 50000 | 10 | 120 |
| Prod. Ex. 14 | P-14 | 2300 | 85 | — | — | — |
| Prod. Ex. 15 | P-15 | 2300 | 85 | — | — | — |
| Prod. Ex. 16 | P-16 | 1700 | 50 | 1000 | 18 | 100 |
| Prod. Ex. 17 | P-17 | 700 | 72 | 400 | 10 | 120 |

Prod. Ex. = production example

TABLE 1-2

|  | Name | Before Heat Treatment ||| After Heat Treatment |||
|---|---|---|---|---|---|---|---|
|  |  | Block Character | Viscosity (mPa·s) | Surface Tension (mN/m) | Block Character | Viscosity (mPa·s) | Surface Tension (mN/m) |
| Prod. Ex. 1 | P-1 | 0.390 | 7.7 | 41.7 | 0.523 | 7.6 | 41.7 |
| Prod. Ex. 2 | P-2 | 0.475 | 19.0 | 47.2 | 0.513 | 19.1 | 47.3 |
| Prod. Ex. 3 | P-3 | 0.502 | 45.0 | 54.0 | 0.549 | 45.2 | 54.0 |
| Prod. Ex. 4 | P-4 | 0.390 | 7.7 | 41.7 | 0.395 | 7.7 | 41.7 |
| Prod. Ex. 5 | P-5 | 0.390 | 7.7 | 41.7 | 0.562 | 8.4 | 42.0 |
| Prod. Ex. 6 | P-6 | 0.390 | 7.7 | 41.7 | 0.501 | 8.0 | 42.2 |
| Prod. Ex. 7 | P-7 | 0.390 | 7.7 | 41.7 | 0.462 | 8.3 | 42.1 |
| Prod. Ex. 8 | P-8 | 0.390 | 7.7 | 41.7 | 0.435 | 8.3 | 42.3 |
| Prod. Ex. 9 | P-9 | 0.475 | 19.0 | 47.2 | 0.529 | 22.0 | 48.3 |
| Prod. Ex. 10 | P-10 | 0.390 | 7.7 | 41.7 | 0.400 | 7.6 | 41.7 |
| Prod. Ex. 11 | P-11 | 0.390 | 7.7 | 41.7 | 0.540 | 7.9 | 42.8 |
| Prod. Ex. 12 | P-12 | 0.390 | 7.7 | 41.7 | 0.420 | 8.6 | 42.8 |
| Prod. Ex. 13 | P-13 | 0.390 | 7.7 | 41.7 | 0.410 | 8.8 | 42.9 |
| Prod. Ex. 14 | P-14 | 0.502 | 45.0 | 54.0 | — | — | — |
| Prod. Ex. 15 | P-15 | 0.544 | 46.0 | 55.2 | — | — | — |
| Prod. Ex. 16 | P-16 | 0.500 | * | * | 0.511 | * | * |
| Prod. Ex. 17 | P-17 | 0.391 | 7.7 | 41.4 | 0.500 | 7.7 | 41.5 |

Prod. Ex. = production example
In Table 1-2, the mark "*" indicates that no measurement was possible due to phase separation.

TABLE 2-1

| | Name | Polymerization Degree | Saponification Degree (mol %) | Absorbance at 280 nm (a) | Absorbance at 320 nm (b) | (b)/(a) |
|---|---|---|---|---|---|---|
| Prod. Ex. 1 | P-1 | 700 | 70 | 0.274 | 0.313 | 1.14 |
| Prod. Ex. 2 | P-2 | 1700 | 78 | 0.020 | 0.030 | 1.50 |
| Prod. Ex. 3 | P-3 | 2300 | 85 | 0.011 | 0.013 | 1.18 |
| Prod. Ex. 4 | P-4 | 700 | 70 | 0.453 | 0.060 | 0.13 |
| Prod. Ex. 5 | P-5 | 700 | 70 | 0.243 | 0.350 | 1.44 |
| Prod. Ex. 6 | P-6 | 700 | 70 | 0.277 | 0.305 | 1.10 |
| Prod. Ex. 7 | P-7 | 700 | 70 | 0.300 | 0.301 | 1.00 |
| Prod. Ex. 8 | P-8 | 700 | 70 | 0.335 | 0.277 | 0.83 |
| Prod. Ex. 9 | P-9 | 1700 | 78 | 0.032 | 0.019 | 0.59 |
| Prod. Ex. 10 | P-10 | 700 | 70 | 0.453 | 0.070 | 0.15 |
| Prod. Ex. 11 | P-11 | 700 | 70 | 0.256 | 0.363 | 1.41 |
| Prod. Ex. 12 | P-12 | 700 | 70 | 0.357 | 0.227 | 0.66 |
| Prod. Ex. 13 | P-13 | 700 | 70 | 0.412 | 0.216 | 0.52 |
| Prod. Ex. 14 | P-14 | 2300 | 85 | 0.021 | 0.001 | 0.05 |
| Prod. Ex. 15 | P-15 | 2300 | 85 | 0.020 | 0.001 | 0.05 |
| Prod. Ex. 16 | P-16 | 1700 | 50 | 0.028 | 0.023 | 1.46 |
| Prod. Ex. 17 | P-17 | 700 | 72 | 0.315 | 0.319 | 1.01 |

Prod. Ex. = production example

TABLE 2-2

| | Name | YI | Transmittance (%) | Block Character After Heat Treatment | Mw/Mn |
|---|---|---|---|---|---|
| Prod. Ex. 1 | P-1 | 10.2 | 97.5 | 0.523 | 2.1 |
| Prod. Ex. 2 | P-2 | 11.1 | 98.9 | 0.513 | 2.2 |
| Prod. Ex. 3 | P-3 | 12.2 | 99.3 | 0.549 | 2.1 |
| Prod. Ex. 4 | P-4 | 7.1 | 82.5 | 0.395 | 2.1 |
| Prod. Ex. 5 | P-5 | 20.5 | 98.7 | 0.562 | 2.1 |
| Prod. Ex. 6 | P-6 | 16.4 | 95.3 | 0.501 | 2.2 |
| Prod. Ex. 7 | P-7 | 25.3 | 94.5 | 0.462 | 2.2 |
| Prod. Ex. 8 | P-8 | 38.6 | 94.0 | 0.435 | 2.4 |
| Prod. Ex. 9 | P-9 | 35.3 | 94.2 | 0.529 | 2.2 |
| Prod. Ex. 10 | P-10 | 8.2 | 72.1 | 0.400 | 2.1 |
| Prod. Ex. 11 | P-11 | 45.1 | 99.2 | 0.540 | 2.1 |
| Prod. Ex. 12 | P-12 | 50.2 | 93.2 | 0.420 | 2.5 |
| Prod. Ex. 13 | P-13 | 61.8 | 92.0 | 0.410 | 2.7 |
| Prod. Ex. 14 | P-14 | 8.2 | 93.2 | 0.502 | 2.1 |
| Prod. Ex. 15 | P-15 | 8.3 | 93.2 | 0.544 | 2.1 |
| Prod. Ex. 16 | P-16 | 12.5 | 53.2 | 0.511 | 2.2 |
| Prod. Ex. 17 | P-17 | 9.4 | 97.0 | 0.500 | 2.2 |

Prod. Ex. = production example

As is clear from Tables 1-1, 1-2, 2-1, and 2-2, the heat treatment changed the block characters of the vinyl alcohol polymers. In the examples mentioned above, the value of block character increased considerably when the heat treatment was carried out under the conditions in which the oxygen concentration was 5 ppm to 8000 ppm, the temperature was 100° C. to 140° C., and the heat treatment time was 5 to 18 hours. By such a heat treatment carried out under the atmosphere in which an oxygen concentration is in a certain range, vinyl alcohol polymers can be obtained that exhibit excellent surface tension and viscosity when they are prepared as aqueous solutions. Thus, less coloration is caused and excellent handling properties are provided.

Polymerization of Polyvinyl Chloride

Examples 1 to 9 and Comparative Examples 1 to 8

Suspension polymerization of polyvinyl chloride was carried out using the above-mentioned vinyl alcohol polymers (P-1 to P-17) as dispersion stabilizers.

First, an autoclave with glass lining was charged with 40 parts by weight of deionized water containing a dispersion stabilizer (P-1 to P-17) dissolved therein and 0.04 parts by weight of a 70% toluene solution of diisopropyl peroxydicarbonate. The inside of the autoclave was evacuated until its internal pressure reached 0.0067 MPa and thereby oxygen was removed. Then, 30 parts by weight of vinyl chloride monomers were charged therein and the reaction solution was heated to 57° C., while being stirred to conduct polymerization. At the start of the polymerization, the pressure inside the autoclave was 0.83 MPa. This pressure reached 0.44 MPa 7 hours after the start of the polymerization, at which time the polymerization was stopped. The unreacted vinyl chloride monomers were purged, and the content was taken out and dehydrated to dryness. The yield of the vinyl chloride polymer was 85%. The mean degree of polymerization thereof was 1050. Polymerizability of vinyl chloride and properties of the vinyl chloride polymers thus obtained were evaluated. Results of the evaluation are indicated in Tables 3-1 and 3-2.

TABLE 3-1

| | Dispersion Stabilizer | | Evaluation of Polymerization | |
|---|---|---|---|---|
| | PVA | Quantity (%/monomer) | Polymerization Stability | Foaming |
| Example 1 | P-1 | 0.10 | A | AA |
| Example 2 | P-2 | 0.12 | A | AA |
| Example 3 | P-3 | 0.14 | A | AA |
| Example 4 | P-4 | 0.10 | B | A |
| Example 5 | P-5 | 0.10 | A | A |
| Example 6 | P-6 | 0.10 | A | A |
| Example 7 | P-7 | 0.10 | A | A |
| Example 8 | P-8 | 0.10 | A | A |
| Comp. Ex. 1 | P-9 | 0.12 | C | B |
| Comp. Ex. 2 | P-10 | 0.10 | C | C |
| Comp. Ex. 3 | P-11 | 0.10 | B | B |
| Comp. Ex. 4 | P-12 | 0.10 | B | C |
| Comp. Ex. 5 | P-13 | 0.10 | B | C |
| Comp. Ex. 6 | P-14 | 0.10 | C | C |
| Comp. Ex. 7 | P-15 | 0.10 | C | C |
| Comp. Ex. 8 | P-16 | 0.12 | C | C |
| Example 9 | P-17 | 0.10 | A | AA |

Comp. Ex. = Comparative Example

TABLE 3-2

| | Evaluation of Polyvinyl Chloride | | | |
|---|---|---|---|---|
| | Mean Particle Diameter (μm) | Plasticizer Absorptivity (%) | Bulk Density (g/cm³) | Coloration |
| Example 1 | 143 | 30.5 | 0.502 | A |
| Example 2 | 131 | 27.2 | 0.523 | A |
| Example 3 | 125 | 25.1 | 0.555 | A |
| Example 4 | 172 | 29.2 | 0.451 | A |
| Example 5 | 145 | 27.5 | 0.499 | B |
| Example 6 | 148 | 29.9 | 0.503 | A |
| Example 7 | 150 | 29.3 | 0.503 | B |
| Example 8 | 161 | 28.5 | 0.462 | B |
| Comp. Ex. 1 | 150 | 22.1 | 0.501 | B |
| Comp. Ex. 2 | 199 | 30.1 | 0.459 | A |
| Camp. Ex. 3 | 160 | 26.1 | 0.477 | C |
| Comp. Ex. 4 | 161 | 26.3 | 0.460 | C |
| Comp. Ex. 5 | 158 | 26.2 | 0.481 | C |
| Camp. Ex. 6 | 167 | 23.4 | 0.502 | A |
| Camp. Ex. 7 | 160 | 20.1 | 0.509 | A |
| Camp. Ex. 8 | 284 | 16.1 | 0.443 | A |
| Example 9 | 136 | 31.3 | 0.496 | A |

Comp. Ex. = Comparative Example

As is apparent from Tables 3-1 and 3-2, polyvinyl chloride with excellent properties was produced stably using vinyl alcohol polymers of P-1 to P-8 and P-17 as dispersion stabilizers.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method of producing a dispersion stabilizer for use in suspension polymerization of a vinyl compound, the dispersion stabilizer comprising a vinyl alcohol polymer (A), the method comprising:
    producing the vinyl alcohol polymer (A) by heat treatment of a vinyl alcohol polymer (B) at a temperature of 90 to 180° C. for 0.5 to 20 hours in an atmosphere having an oxygen concentration of 8000 ppm or lower, the vinyl alcohol polymer (B) having a saponification degree of at least 60 mol % and containing residual acetic acid groups whose block character is in a range of 0.3 to 0.6.

2. The method according to claim 1, wherein the oxygen concentration of the atmosphere is at least 5 ppm.

3. The method according to claim 1, wherein the heat treatment is carried out for at least five hours.

4. The method according to claim 1, wherein a difference between block character of the residual acetic acid groups of the vinyl alcohol polymer (A) and the vinyl alcohol polymer (B) is at least 0.02 and a difference in surface tension between their 0.4-wt. % solutions is 0.5 mN/m or less.

5. The method according to claim 1, wherein a difference in viscosity between 4-wt. % aqueous solutions of the vinyl alcohol polymer (A) and the vinyl alcohol polymer (B) is 0.5 mPa·s or less.

6. The method according to claim 1, further comprising:
    producing a vinyl ester polymer by polymerizing monomers containing substantially no ethylene; and
    producing the vinyl alcohol polymer (B) by saponifying the vinyl ester polymer.

7. The method according to claim 6, wherein the monomers are vinyl acetate, and the vinyl ester polymer is polyvinyl acetate.

* * * * *